United States Patent [19]

Loock

[11] 4,101,329
[45] Jul. 18, 1978

[54] AQUEOUS INK FOR AN INK EJECTION PROCESS

[75] Inventor: Ehrenfried Loock, Wilhelmshaven, Germany

[73] Assignee: Olympia Werke AG, Wilhelmshaven, Germany

[21] Appl. No.: 667,378

[22] Filed: Mar. 16, 1976

[30] Foreign Application Priority Data

Mar. 19, 1975 [DE] Fed. Rep. of Germany ....... 2511902

[51] Int. Cl.$^2$ ...................... C09D 11/00; C09D 11/02
[52] U.S. Cl. ......................................... 106/22; 106/20
[58] Field of Search .............................. 106/22, 20, 23

[56] References Cited

U.S. PATENT DOCUMENTS 3,846,141  11/1974  Ostergren et al. ..................... 106/22
3,889,269  6/1975   Meyer et al. .......................... 106/22

FOREIGN PATENT DOCUMENTS 2,164,614  9/1973  Fed. Rep. of Germany.

Primary Examiner—Allan Lieberman
Attorney, Agent, or Firm—Spencer & Kaye

[57] ABSTRACT

An aqueous ink for an ink ejection process, particularly a blue ink for a process employing an ejection system which produces droplets, comprises (a) a water soluble triphenyl methane dye and (b) a buffer mixture of at least one organic hydroxy-containing carboxylic acid and at least one water soluble amine.

7 Claims, No Drawings

AQUEOUS INK FOR AN INK EJECTION PROCESS

BACKGROUND OF THE INVENTION

The present invention relates to an ink, and more particularly, to an aqueous ink for use in an ink ejection process.

German Auslegeschrift No. 2,164,614, hereby incorporated by reference, for example, discloses an ink ejection process in which temporary pressures are produced in an ejection head leading to the discharge of ink from capillary nozzles and to interruption of this ink flow to form droplets. To have an ink which is suitable for such ejection processes, certain parameters must be present. Thus, a clean printed picture requires, among other things, uniformly sized ink drops. These depend, on the one hand, on the geometry of the nozzle and on the configuration of the break-off plane. On the other hand, the ink must have as high a surface tension as possible. The supply of ink in the ejection head, for example, from an ink reservoir is often effected without pressure through capillaries. In order to attain a high ejection speed, however, the ink employed must have a low viscosity. The selection of suitable inks is limited, on the one hand, by its drying behavior. When the ejection system is at rest, ink components must not crystallize out in the area of the ejection head after long periods of inactivity. On the other hand, no surface film must form in the nozzle opening as a result of the evaporation of water. A slight increase in viscosity of the ink in the area of the nozzle, however, generally will not lead to malfunction of the ejection system, but, in the past, a character printed first after a period of inactivity will appear imprecise. The replenishment of solvents, such as water in this case, into the area of evaporation of the nozzle opening takes place through long capillary systems. In this case, similar physical properties are inherent in the ink in the nozzle exit area after longer periods of inactivity as they are encountered by ink drops without the addition of solvents under normal environmental conditions, such as the influence of temperature and humidity. Thus, the ink must remain fluid even with significant evaporation and must not deposit solids.

In order to avoid drying, moisturizing agents, such as glycerin, for example, are added to commercially available water-based inks. This additive, however, increases viscosity. The color intensity of such an ink is sufficient at most and its pH lies at 1.8 compared to a pH of 4 to 5 which would be favorable for ejection processes as defined above.

SUMMARY OF THE INVENTION

It is a primary object of the present invention to provide an aqueous ink which satisfies the required parameters for use in an ink ejection process.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides an aqueous ink for an ink ejection process which comprises: (a) a water soluble triphenyl methane dye and (b) a buffer mixture of at least one organic hydroxy-containing carboxylic acid and at least one water soluble amine.

Preferably, the buffer components comprise citric acid and triethanolamine with which the pH of the ink can be adjusted, and enables the pH of the ink to be set to a pH of 4 to 5. It is further preferred to increase the ejection speed of the ink by adding a flow improving additive. Preferably, the flow improving additive is polyethylene glycol and the ink contains 0.2 to 0.5% by weight of this additive.

Further advantages of the present invention result from the fact that the pH of the ink can be set by means of the buffer solution and that the setting of the pH value produces maximum color intensity without an increase in the color concentration. Thickened ink can again be dissolved. Ink which thickens in the area of the nozzle reduces the problem of sealing of the nozzle openings, particularly in the nonoperative state of an ink ejection printer. The buffer system has no influence on the surface tension of the ink and the ink is hydrophilic. The ink of the present invention can be used in an ejection system which produces droplets.

It is to be understood that both the foregoing general description and the following detailed description are exemplary, but are not restrictive of the invention.

DETAILED DESCRIPTION OF THE INVENTION

The aqueous ink of the present invention contains an organic dye as the coloring agent. The organic dye is water-soluble, and generally is a triphenyl methane dye, preferably one which imparts a blue color. The triphenyl methane dye "Ink Blue BJTN", sold by Farbwerke Hoechst AG, Frankfurt, is an example of a suitable dye that can be used in accordance with the present invention. The dye is present in the aqueous ink in conventional amounts, and, for example, can be present in amounts of 10 to 20 grams per liter. The triphenyl methane dye can be added to the ink in amounts ranging from 5 to 50 g/l.

Since color intensity as well as water solubility of dyes of the triphenyl methane type are heavily dependent on the pH, it has been found in accordance with the present invention that it is advisable, in order to maintain the best possible pH, to employ a buffer system which is compatible with the composition of the dye without neglecting the above-mentioned requirements for the ink.

For technical and economic reasons, ink ejection heads are made of metallic materials. Consumption of protons as it may occur as a result of corrosion of the aqueous dye solution on metal surfaces or from metal oxides on record carriers adversely influences color intensity. The decisive factor is that corrosion over longer periods of time will not result in the formation of deposits of metal ions with the dye. A minimum amount of uniform surface abrasion is negligible in this connection. Since corrosion changes the pH and consequently increases the concentration of the leuco bases of the triphenyl methane dye which are only relatively difficultly soluble in water, the buffer system according to the invention produces a stabilization of the ink. The addition of an acid, which in the correct pH range produces a strong buffer effect, results in optimum color intensity.

The buffer components of the aqueous ink of the present invention comprises a mixture of at least one organic hydroxy-containing carboxylic acid and at least one water-soluble amine. Examples of suitable organic hydroxy-containing carboxylic acids that can be used in the present invention include citric acid, malic acid, gluconic acid, tartaric acid, preferably citric acid. Examples of suitable water-soluble amines include diethanolamine, ethanolamine, ethylenediamine, triethanolamine, preferably diethanolamine. A factor to be considered in selecting the particular acid and amine that are used to buffer the aqueous ink is that all components of the ink should not contain any long aliphatic or aromatic groups which would greatly reduce surface tension.

The carboxylic acid can be added to the ink in amounts ranging from 5 to 200 g/l, preferably 20 to 50 g/l. The amine can be added to the ink in amounts ranging from 5 to 200 g/l, preferably 20 to 50 g/l. The exact amount of each of these two components can be varied to achieve a desired pH in the ink, such as a pH of 4 to 5.

In forming the ink, the dye and buffer components are added to water, preferably with the dye being added first, followed by addition of the amine and then addition of the acid.

In addition, for technical reasons, the capillary channels of the systems employed for the ejection process cannot be manufactured to produce optimum flow without major difficulties. In a preferred embodiment of the present invention, 0.2 to 0.5% by weight polyethylene glycol is added to the ink and produces a significant improvement of the flow properties of the ink.

The following example is given by way of illustration to further explain the principles of the invention. This example is merely illustrative and is not to be understood as limiting the scope and underlying principles of the invention in any way. All percentages referred to herein are by weight unless otherwise indicated.

EXAMPLE

The following ink mixture was prepared and produced a significant improvement over a similar known ink which was not buffered:

a. 10 to 20 g "Tintenblau (ink blue) BJTN" dye per liter;
b. 80 to 100 ml of 90% diethanol amine per liter;
c. 80 to 100 g of citric acid hydrate per liter.

The buffer solution produced by the addition of the citric acid hydrate and diethanol amine set the pH of the ink to 4 to 5. The ink was formed by first adding the dye to the water, followed by addition of the amine and then by addition of the acid.

It will be understood that the above description of the present invention is susceptible to various modifications, changes and adaptations, and the same are intended to be comprehended within the meaning and range of equivalents of the appended claims.

What is claimed is:

1. An aqueous ink for an ink ejection process comprises: (a) a water soluble triphenyl methane dye and (b) a buffer mixture of 5 to 200 g/l of ink of at least one organic hydroxy-containing carboxylic acid selected from the group consisting of citric acid, malic acid, gluconic acid and tartaric acid and 5 to 200 g/l of ink of at least one water soluble amine selected from the group consisting of diethanolamine, ethanolamine, ethylenediamine and triethanolamine.

2. The aqueous ink as defined in claim 1, wherein the buffer mixture comprises citric acid and triethanolamine which sets the ink to a pH of 4 to 5.

3. The aqueous ink as defined in claim 1, wherein the ink contains 0.2 to 0.5% by weight of polyethylene glycol.

4. The aqueous ink as defined in claim 1, wherein the dye is one that produces a blue ink.

5. The aqueous ink as defined in claim 1, wherein the buffer mixture contains 20 to 50 g/l of ink of said carboxylic acid and 20 to 50 g/l of ink of said amine.

6. The aqueous ink as defined in claim 1, wherein the buffer mixture sets the ink to a pH of 4 to 5.

7. The aqeuous ink as defined in claim 5, wherein the ink contains 0.2 to 0.5% by weight of polyethylene glycol.

* * * * *